United States Patent Office 2,707,151
Patented Apr. 26, 1955

REISSUED
DEC. 25, 1956
Re. 24,261

2,707,151

ANIMAL FEED AND METHOD FOR MAKING THE SAME

Stanley A. Martin, Lebanon, Ohio

No Drawing. Application April 15, 1954,
Serial No. 423,523

8 Claims. (Cl. 99—6)

The present invention relates to a process for dehydrating molasses and for simultaneously forming a high molasses concentration animal feed and to the product produced thereby.

It has been long recognized that the dehydration of blackstrap molasses or other aqueous molasses by-products from the refining of cane, beet and corn sugars is accompanied by certain inherent difficulties. Among the more important of these difficulties is the deterioration of the molasses by charring when the temperature of the molasses is raised to the point which is necessary to evaporate water. The customary method of overcoming this difficulty has been to employ vacuum techniques and specifically to dehydrate in batches under reduced pressure. For volume production, batch operations are uneconomical and when attempts are made to continuously dehydrate under vacuum conditions, many problems are encountered in maintaining the vacuum as the water is removed, and as the molasses is fed in and removed from the processing equipment. The primary object of the present invention is to provide a process for dehydrating molasses which overcomes the problems heretofore encountered and which is simple, efficient and inexpensive in operation.

Another object of this invention is to provide a continuous process for dehydrating molasses and for producing animal feed therefrom which eliminates the necessity for using vacuum techniques.

A further object of this invention is to provide a process for making high molasses sugar content animal feeds in dry, non hygroscopic, pellet form, in which form the animal feed is storage stable, readily handleable and inexpensively transportable.

A still further object of this invention is the provision of a pure dehydrated molasses product in pellet form and a high molasses sugar content animal feed in non-hygroscopic pellet form.

Other objects and advantageous features of the invention will become apparent upon considering the present disclosure in its entirety.

The present invention is based on the discovery that it is possible to greatly exceed the temperature at which molasses normally chars or caramelizes and to attain such temperatures that the moisture content of molasses is flashed off as steam if the temperature is maintained at such high levels for only relatively short periods of time, that is, seconds rather than minutes. In accordance with the process of this invention, blackstrap molasses or its equivalent is admixed with a filler material and in mixed form is pressure extruded through a foraminous plate. The pressure developed in the extrusion of the mixture is sufficient to raise the temperature in the mixture well above the boiling point of water and in a range between about 225° F. and 350° F. such that as the material exits from the apertures in the plate, steam is evolved in large quantities. After water evaporates from the mixture, the mixture is rapidly cooled and together with supplementary cooling is rapidly lowered to a temperature below the charring point and the extrusion step is then repeated until the moisture content is reduced to the desired level, preferably below about 5% by weight. It has been found that in the present process of pressure extruding, the pressures at the foraminous plate are in the neighborhood of 250 pounds per square inch and that the temperatures attained within the mixture are normally above 300 degrees F. and that no charring or deleterious effects occur if the time which the mixture remains at such elevated temperatures is kept below about fifteen seconds. These conditions may be repeatedly duplicated on the same material without encountering harmful charring. Additionally, it has been found that due to the extreme pressures and temperatures which exist at the extrusion plate, there is a reaction occurring at the interface between the apertures of the extrusion plate and the material which is being forced therethrough such that the resulting extruded pellet has a slightly different color at its surface than that of the center of the pellet. The resulting pellets have a greater resistance to the absorption of water from the atmosphere than any heretofore known dried molasses materials. The reason for this increased resistance to water absorption is not definitely known, but it is believed that the extra hard and smooth surface film which exists on the periphery of the pellets is responsible for this characteristic, and it is thought that the surface film results from polymerization of the resins present in the molasses.

The process of this invention is broadly applicable to all of the known types of industrial molasses including cane blackstrap molasses, refiners blackstrap molasses, high test molasses, beet molasses, hydrol and citrus molasses. Where animal feed is the ultimate objective, cane blackstrap molasses is preferred. As these molasses are normally obtained from the sugar processing industries they normally include 15% to 30% water. In order to develop the required pressures in extruding the molasses through a foraminous plate, the molasses is first admixed with a filler material to form a slurry or stiff mass.

A wide variety of filler materials may be employed for this purpose and the filler selected will depend upon the product which is desired. When it is desired to form a pure dehydrated molasses product, the filler may consist of cane or beet sugar depending upon the source of the molasses being employed. When the product is to be used as an animal feed suitable fillers may comprise ground grain mill screenings, sugar beet pulp, sugar beet seeds, peanut hulls, cottonseed hulls, alfalfa, citrus pulp, ground corn cobs or mixtures thereof. It will be apparent that the proportion of filler which must be admixed with the molasses starting material will necessarily vary with the moisture content of that molasses since the greatest pressures during extrusion result from the forcing of thick viscous solids through the extrusion plate. While the proportion of filler solids is not critical to the invention, suitable proportions have been found to be about 20–65% filler and 80–35% molasses. When the molasses content exceeds about 80% of the mixture, it is difficult to obtain sufficient pressure during the extrusion to attain the necessary temperatures to flash the steam from the mixture. Similarly when the proportion of filler exceeds about 65%, the pressures developed in the extrusion approach a maximum that can be handled and the efficiency of the process decreases due to the requirement for handling a high proportion of solids relative to the moisture which is removed.

In employing the process of this invention for producing pure dry molasses solids, the process may be started with cane sugar solids and thereafter the filler may be a recycled portion of the molasses solids which are obtained from the extrusion steps. As above indicated, it is usually necessary to subject the mixed molasses and filler to a series of extrusion steps, the number of steps depending upon the moisture content of the original molasses and the desired degree of dryness of the final product. As a typical example, it has been found possible to reduce the amount of moisture in a mixture of molasses and grain mill screenings from 29% by weight to 1% by weight in three extrusion steps.

From both the standpoint of economical operation and the quality of the resultant product, it is preferred that the time during which the material remains at temperatures above the charring point of molasses be restricted to the shortest possible time. This time period is easily controlled by controlling the speed of passage of the mixture through the extrusion apparatus and by the cooling techniques employed on the material leaving the extrusion plate. While the maintenance of the mixed molasses material at temperatures well above the normal charring point for periods of up to about 15 seconds is not harmful, it is preferred that the time be kept in the neighborhood of 5 to 8 seconds, the normal charring point of molasses being about 140° F.

The method and product of this invention is illustrated in greater detail in the example given below.

Example

Cane blackstrap molasses having a water content of 19% by weight was admixed with wheat mill screenings having a water content of 10% in the ratio of 68% molasses and 32% screenings. The molasses was preliminarily heated to approximately 100 degrees F. and the mixing was accomplished in a paddle type mixer turning at the speed of about 1200 R. P. M. The admixed material was then moved to the first extruder. This extruder advanced the material from one end to the other in approximately five seconds during which time the temperature was raised from about 100 degrees F. up to about 320 degrees F., measured at a point adjacent to the inside surface of the foraminous plate. The foraminous plate was merely a flat steel plate approximately 1½ inches thick and 7 inches in diameter having 300 three-sixteenth inch diameter holes positioned therein. As the material exits from the extrusion plate, clouds of steam escape and cool dry air is forceably blown on the escaping material over a 30 second interval prior to the feeding of the extruded material into the succeeding extruder. The material was then passed through a second extruder, comparable in every respect to the first extruder and thereafter through a third extruder in similar manner. The pellets emanating from the extrusion plate of the third extruder, after cooling, were extremely hard and found to be coated with a smooth, hard skin which was slightly darker in color than the central portion of the pellet. The water content of the pellets was 1 percent.

In commercial production the extrusion step is repeated until the moisture content of the extruded pelletized product is below about 5% by weight. In general, it is preferred that the moisture content be reduced well below 5% and in the range of .5%–3%. It is to be understood that conventional drying techniques to remove the last traces of water may be employed in conjunction with the extrusion steps if desired, although such drying techniques have not been found to be necessary in order to reduce the moisture content of the extruded product to between .8% and 1.5%. In using conventional drying techniques, care should be taken to avoid raising the temperature above the normal charring temperature of molasses.

The pellets were tested for resistance to moisture absorption by subjecting the same to moist atmospheric conditions for a thirty day period and at the end of this time the pellets were found to be still in dry non-tacky form. The pellets were admixed with conventional cattle feed and found to be readily acceptable by cattle.

What is claimed is:

1. A process for dehydrating molasses which comprises the steps of mixing molasses with a filler to form a mixture, raising the temperature of said mixture so as to substantially avoid charring of said molasses to between 225° F. and 350° F. for less than about 15 seconds thereby flashing steam therefrom, rapidly cooling said mixture to a temperature below 140° F. and repeating said steps until the moisture content is below about 5% by weight.

2. A process for dehydrating molasses which comprises the steps of mixing molasses with a filler, rapidly extruding the mixture through a formaminous plate under pressure such that the temperature in the mixture increases from below the charring point to a temperature sufficiently high to flash off steam at the exit side of said plate, said high temperature being maintained for a relatively short period of time, cooling the extruded mixture and repeating the extrusion step until the moisture content in the extruded mixture is below about 5% by weight.

3. A process for forming animal feed which comprises the steps of mixing molasses with an edible filler in the proportions of 35%–80% molasses and 20%–65% filler, raising the temperature of said mixture so as to substantially avoid charring of said molasses to between 225° F. and 350° F. for less than about 15 seconds thereby flashing steam therefrom, rapidly cooling said mixture to a temperature below 140° F. and repeating said steps until the moisture content is below about 5% by weight.

4. A process for forming animal feed which comprises the steps of mixing molasses with an edible filler in the proportions of 35%–80% molasses and 20%–65% filler, rapidly extruding the mixture through a foraminous plate under pressure such that the temperature in the mixture increases from below the charring point to between about 225° F. and 350° F. and steam is flashed therefrom at the exit side of said plate, said temperature being maintained for a relatively short period of time, rapidly cooling the extruded mixture to a temperature below 140° F. and repeating the extrusion step until the moisture content in the extruded mixture is below about 5% by weight.

5. A process as claimed in claim 4 in which the said filler is grain mill screening.

6. A process for forming pure dry molasses which comprises the steps of mixing cane blackstrap molasses with cane sugar in the proportions of 35%–80% molasses and 20%–65% cane sugar, rapidly extruding the mixture through a foraminous plate under pressure such that the temperature in the mixture increases from below the charring point to between 225° F. and 350° F. for less than about 10 seconds thereby flashing steam from the said mixture, rapidly cooling the said mixture to a temperature below 140° F. and repeating said steps until the moisture content is less than 3% by weight.

7. Pure dry molasses particles having a hard non-hygroscopic film on the outer surface thereof, said particles being the product of the process of claim 1.

8. A high molasses content animal feed consisting of dehydrated molasses and a filler selected from the group consisting of grain mill screenings, beet pulp, beet seeds, citrus pulp, peanut hulls, cotton seed hulls, alfalfa and ground corn cobs and having a total sugar content between 35% to 40%, said feed being in the form of particles having a hard peripheral skin which is resistant to the absorption of water, said feed being the product of the process of claim 4.

References Cited in the file of this patent

UNITED STATES PATENTS

| 1,184,228 | Carter | May 23, 1916 |
| 1,286,742 | O'Rourke | Dec. 3, 1918 |
| 1,638,964 | Schreiber | Aug. 16, 1927 |
| 2,124,950 | Knapheide et al. | July 26, 1938 |